US008852056B2

(12) United States Patent
Gibson et al.

(10) Patent No.: US 8,852,056 B2
(45) Date of Patent: *Oct. 7, 2014

(54) METHOD FOR STARTING AN ENGINE

(71) Applicant: Ford Global Technologies, LLC, Dearborn, MI (US)

(72) Inventors: Alex O'Connor Gibson, Ann Arbor, MI (US); Felix Nedorezov, Rochester Hills, MI (US); Seung-Hoon Lee, Northville, MI (US); Yuji Fujii, Ann Arbor, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/066,202

(22) Filed: Oct. 29, 2013

(65) Prior Publication Data
US 2014/0057755 A1 Feb. 27, 2014

Related U.S. Application Data

(63) Continuation of application No. 13/292,950, filed on Nov. 9, 2011, now Pat. No. 8,568,272.

(51) Int. Cl.
B60W 10/06 (2006.01)
B60W 10/10 (2012.01)
B60W 30/18 (2012.01)
B60W 10/11 (2012.01)
B60W 10/02 (2006.01)
F02N 19/00 (2010.01)

(52) U.S. Cl.
CPC ......... F02N 19/00 (2013.01); B60W 30/18018 (2013.01); B60W 10/11 (2013.01); B60W 10/02 (2013.01); F61H 59/16 (2013.01); B60W 10/06 (2013.01)
USPC ........................................................ 477/115

(58) Field of Classification Search
USPC ........................................................ 477/115
See application file for complete search history.

(56) References Cited

U.S. PATENT DOCUMENTS

| | | | |
|---|---|---|---|
| 8,568,272 B2* | 10/2013 | Gibson et al. | 477/115 |
| 2004/0007405 A1 | 1/2004 | Noda et al. | |
| 2004/0152558 A1 | 8/2004 | Takami et al. | |
| 2005/0221952 A1 | 10/2005 | Tetsuno et al. | |
| 2006/0184304 A1 | 8/2006 | Katou et al. | |
| 2008/0045382 A1 | 2/2008 | Kawasaki et al. | |
| 2008/0125944 A1 | 5/2008 | Kamishima et al. | |
| 2010/0324798 A1 | 12/2010 | Rew et al. | |
| 2011/0263381 A1 | 10/2011 | Katou | |

* cited by examiner

Primary Examiner — Edwin A Young
(74) Attorney, Agent, or Firm — Julia Voutyras; Alleman Hall McCoy Russell & Tuttle LLP

(57) ABSTRACT

A method for improving starting of an engine that may be repeatedly stopped and started is presented. In one example, the method adjusts a desired engine speed to at least two levels during engine speed run-up from cranking to engine idle speed. The method may improve vehicle launch for stop/start vehicles.

20 Claims, 6 Drawing Sheets

METHOD FOR STARTING AN ENGINE

CROSS REFERENCE TO RELATED APPLICATIONS

The present application is a continuation of U.S. patent application Ser. No. 13/292,950, filed on Nov. 9, 2011, now U.S. Pat. No. 8,568,272, the entire contents of which are hereby incorporated by reference for all purposes.

FIELD

The present description relates to a method for improving starting of an engine. The method may be particularly useful for engines that are automatically stopped and then automatically restarted.

BACKGROUND AND SUMMARY

An engine coupled to an automatic transmission may be stopped and restarted to conserve fuel during conditions of low engine torque demand. If the engine is started while the transmission is in neutral, the speed of the engine at restart may not be of much concern so long as engine starting speed is somewhat repeatable. However, if the engine is started while the transmission is in gear, the torque transmitted by the engine to the transmission during engine run-up from crank to idle speed may be objectionable to the driver if more than a desired amount of engine torque is transferred from the engine to the transmission during engine restart. Additionally, if the driver requests torque from the engine to accelerate a vehicle shortly after an engine is started in gear, delivery of engine torque to the vehicle wheels may not be smooth and may be objectionable to the driver.

The inventors herein have recognized the above-mentioned disadvantages of restarting an engine coupled to a transmission that is in gear and have developed a method for starting an engine coupled to a transmission, comprising: cranking the engine from stop; releasing an off-going clutch of the transmission to downshift the transmission during engine speed run-up from cranking to idle speed; and applying an on-coming clutch of the transmission in response to a reduction of a transmission input torque brought about via the off-going clutch.

Torque that is transmitted from an engine and output from a transmission during engine starting may be controlled via starting the engine in a first gear that is applied by a first transmission clutch (e.g., the off-going clutch). In particular, starting the engine while the transmission is in a higher gear having a lower gear ratio (e.g. fourth gear having a ratio of 1:1) may limit the amount of engine torque that is transmitted through the transmission to wheels of a vehicle. Further, the transmission may be shifted to a second lower gear having a higher gear ratio (e.g., first gear having a ratio of 3:1) that is applied by a second transmission clutch (e.g., the on-coming clutch) when a driver requests that the engine accelerate or launch a vehicle from stop. Shifting the transmission to a lower gear having a higher gear ratio may improve vehicle launch. In addition, the torque transfer from the engine to the vehicle wheels may be improved by applying the on-coming clutch as torque across the off-going clutch is decreased. In this way, torque can be transferred from one gear set to the next gear set such that torque may flow through the transmission without a substantial torque decrease at the vehicle wheels during the downshift, thereby improving vehicle launch.

The present description may provide several advantages. Specifically, the approach may improve vehicle launch for engines that are automatically stopped and restarted. Further, the approach may improve vehicle emissions since the engine may be started in a more repeatable manner. Further still, the approach may improve vehicle drivability by improving the way torque is transmitted from the engine to vehicle wheels.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where.

DETAILED DESCRIPTION

Figure 1:
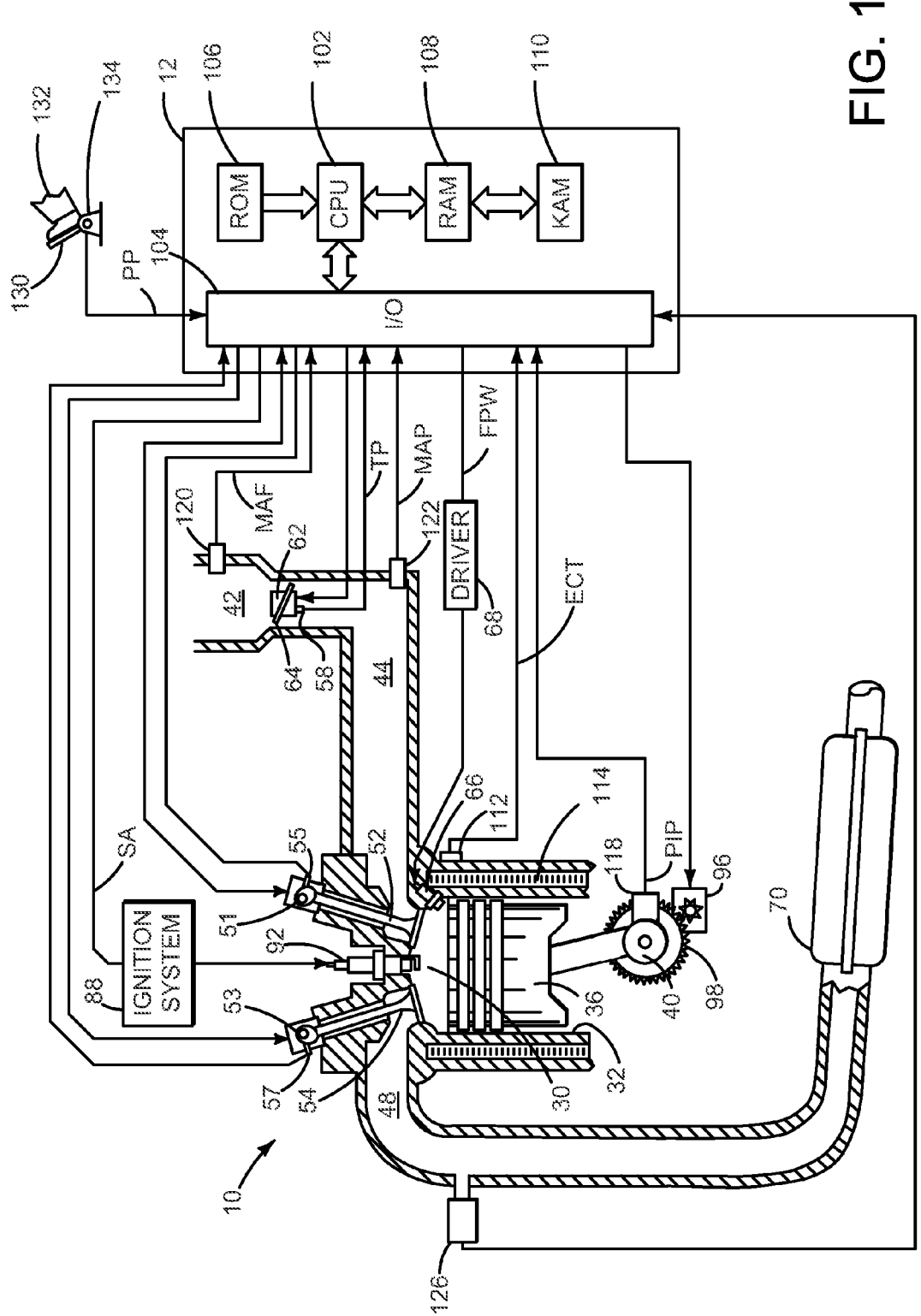
FIG. 1 is a schematic diagram of an engine.
Figure 2:
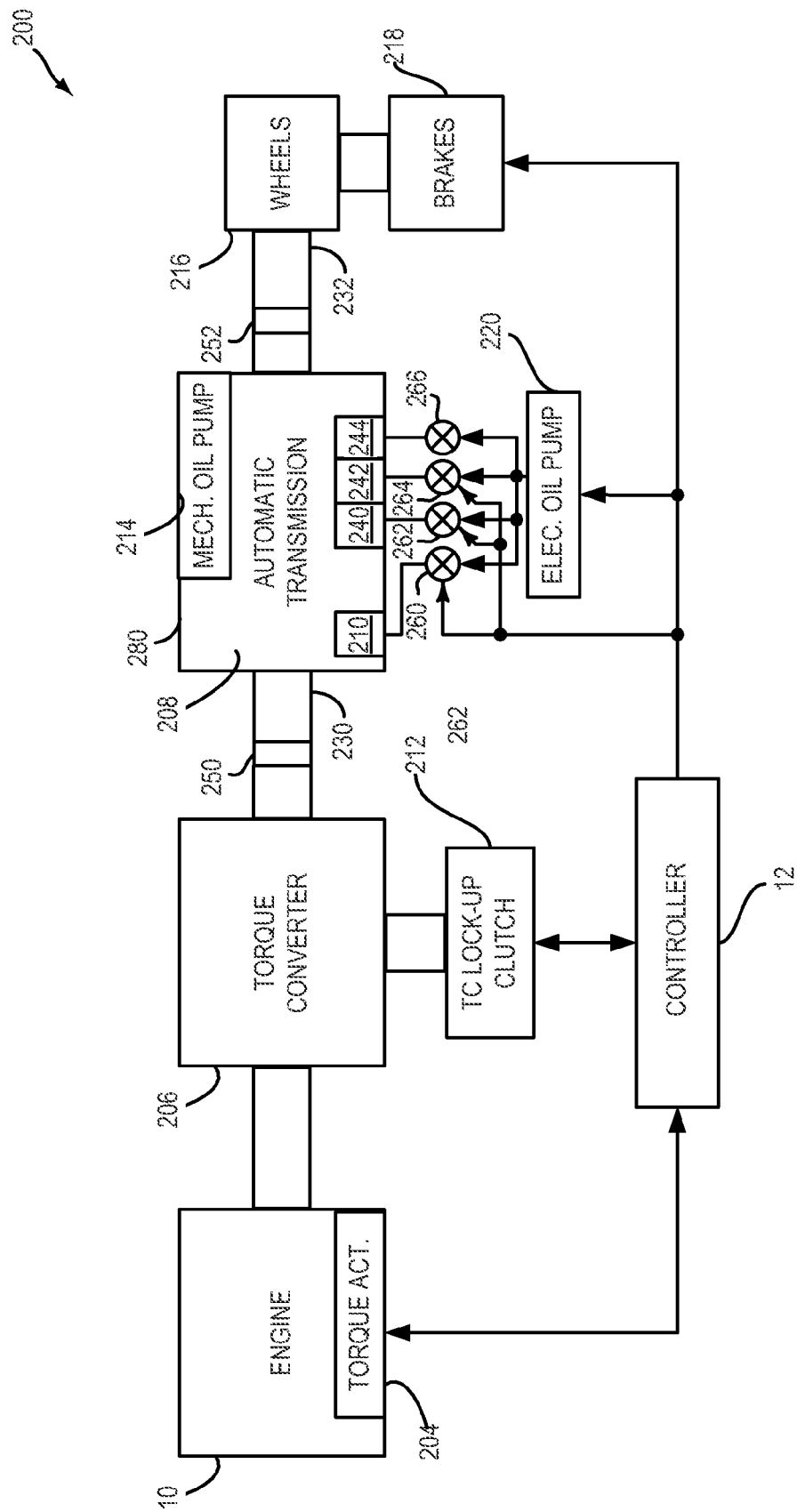
FIG. 2 shows an example vehicle system layout.
Figure 3:
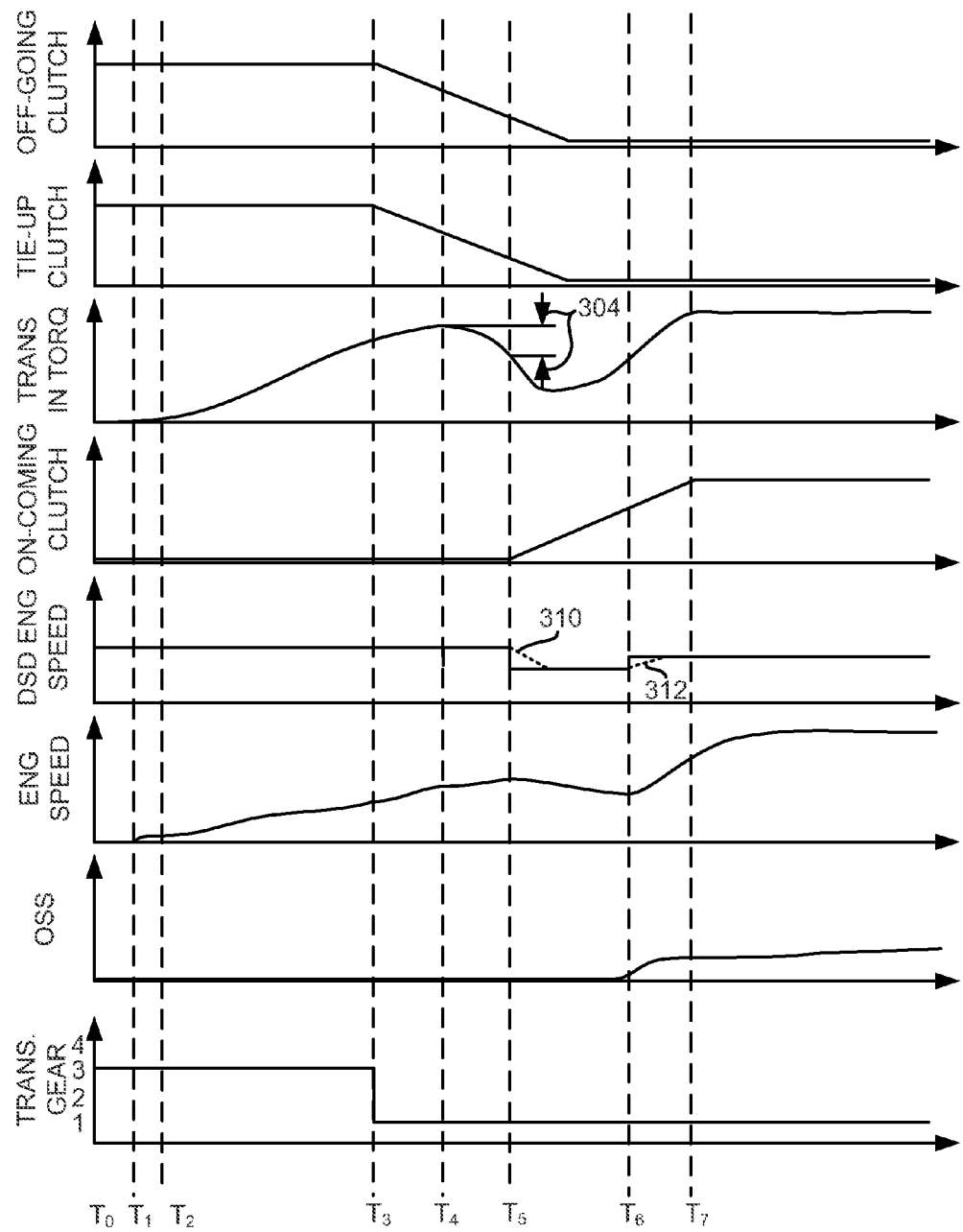
FIGS. 3-5 are example plots of signals of interest during a simulated engine starts.
Figure 4:
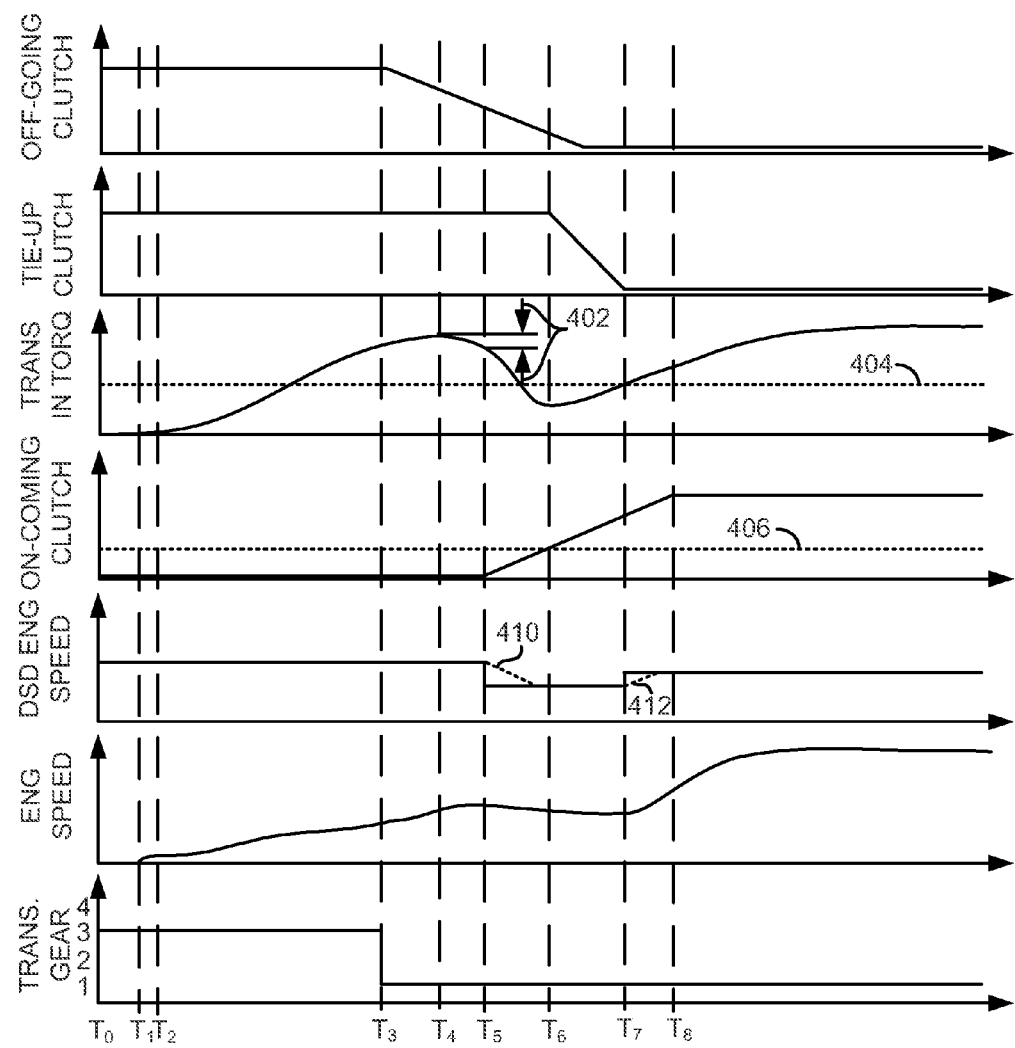
Figure 5:
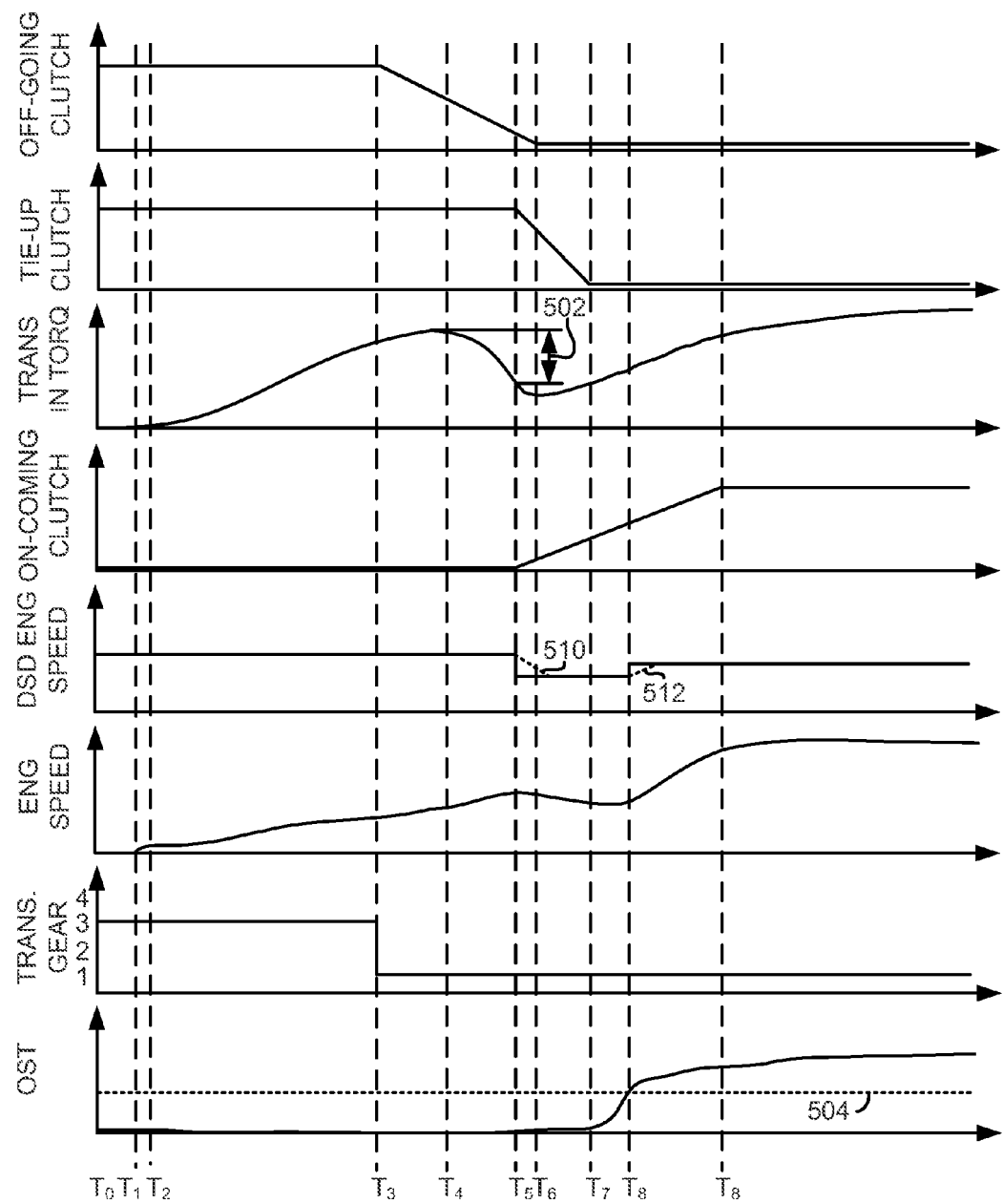
Figure 6:
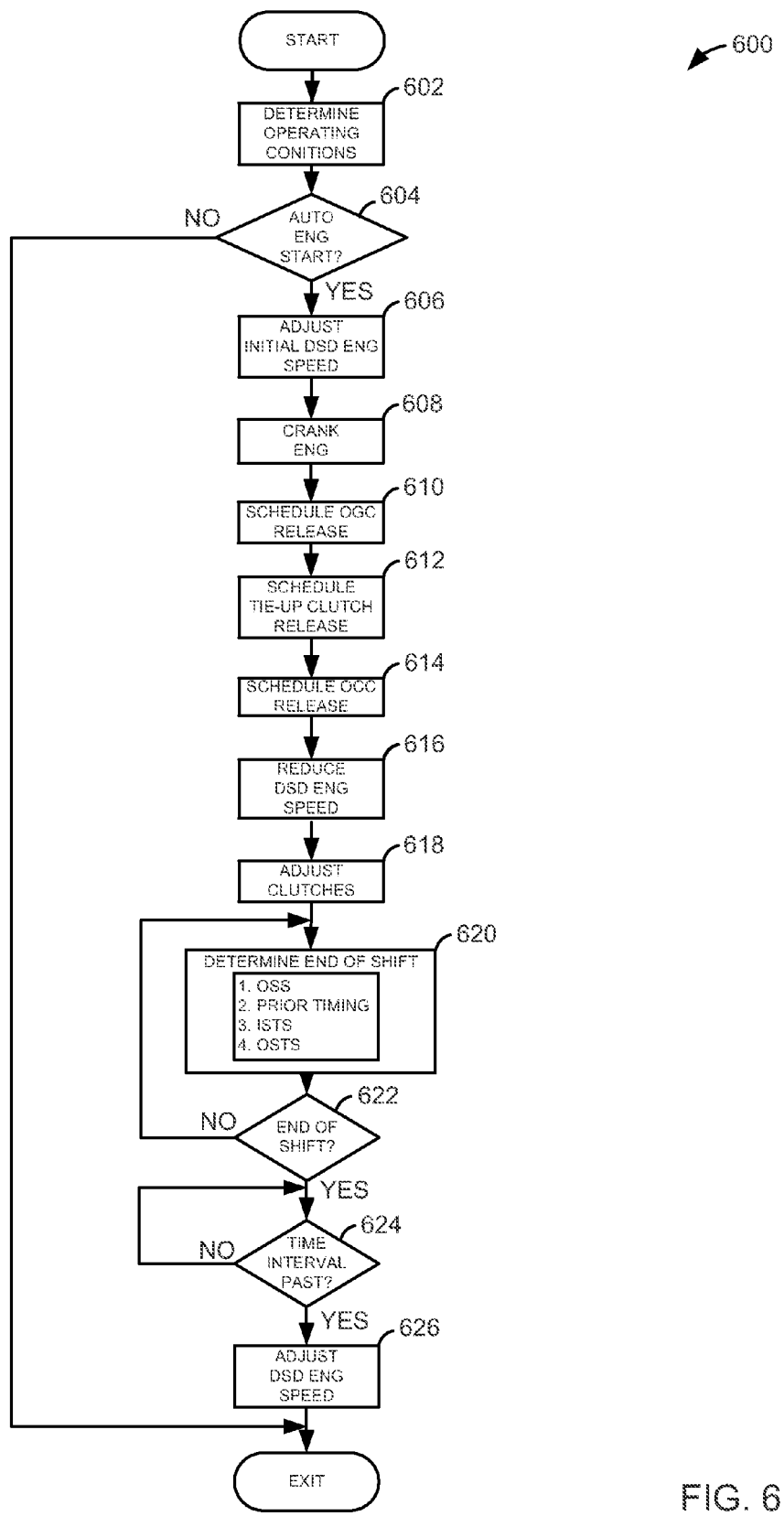
FIG. 6 is a flowchart of an example method for starting an engine.

The present description is related to automatically starting an engine coupled to a transmission. In one non-limiting example, the engine may be configured as illustrated in FIG. 1. Further, the engine may be part of a vehicle as illustrated in FIG. 2. Examples of engine starting sequences according to the method of FIG. 6 are shown in FIGS. 3-5. The sequences show ways to control engine speed and smoothly transfer engine torque to vehicle wheels during automatic restarts.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 98 is coupled to crankshaft 40 and may be rotated via starter 96. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown)

including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In one example, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-directional Hall sensor or equivalent, the engine position may be maintained through shut-down, but during re-start alternative strategy may be used to assure that the engine is rotating in a forward direction.

FIG. 2 is a block diagram of a vehicle drive-train 200. Drive-train 200 may be powered by engine 10. Engine 10 may be started with an engine starting system (not shown). Further, engine 10 may generate or adjust torque via torque actuator 204, such as a fuel injector, throttle, etc.

An engine output torque may be transmitted to torque converter 206 to drive an automatic transmission 208. In one example, the torque converter may be referred to as a component of the transmission. Torque at transmission input shaft 230 may be sensed via torque sensor 250. Further, one or more clutches may be engaged, including forward clutch 210, to propel a vehicle. Additionally, transmission 208 may include a plurality of gear clutches that may be engaged as needed to activate a plurality of fixed transmission gear ratios. Gear clutches may include on-coming clutch 240 and off-going clutch 242 as well as additional gear clutches. The transmission may also include a tie-up clutch 244 for grounding the transmission input shaft 230 to the transmission case 280. Controller 12 operates valves 260-266 to supply oil to clutches 210 and 240-244.

The output of the torque converter may in turn be controlled by torque converter lock-up clutch 212. For example, when torque converter lock-up clutch 212 is fully disengaged, torque converter 206 transmits engine torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to transmission input shaft 230. Alternatively, the torque converter lock-up clutch 212 may be partially engaged, thereby enabling the amount of torque relayed from the engine to the transmission to be adjusted. A controller may be configured to adjust the amount of torque transmitted by torque converter 212 by adjusting the torque converter lock-up clutch in response to various engine operating conditions, or based on a driver-based engine operation request.

Torque output from the automatic transmission 208 may in turn be relayed to wheels 216 via output shaft 232 to propel the vehicle. Specifically, automatic transmission 208 may transfer an input driving torque at the input shaft 230 responsive to a vehicle traveling condition before transmitting an output driving torque to the wheels 216 via output shaft 232.

Output shaft torque sensor 252 may be provided to sense transmission output torque. Alternatively, torque at the transmission input shaft 230 may be grounded to the vehicle chassis via transmission case 280.

Further, a frictional force may be applied to wheels 216 by engaging wheel brakes 218. In one example, wheel brakes 218 may be engaged in response to the driver pressing his foot on a brake pedal (not shown). In the same way, a frictional force may be reduced to wheels 216 by disengaging wheel brakes 218 in response to the driver releasing his foot from a brake pedal. Further, vehicle brakes may apply a frictional force to wheels 216 as part of an automated engine stopping procedure.

A mechanical oil pump 214 may be in fluid communication with automatic transmission 208 to provide hydraulic pressure to engage various clutches, such as forward clutch 210, gear clutches 240-244, and/or torque converter lock-up clutch 212. Mechanical oil pump 214 may be operated in accordance with torque converter 212, and may be driven by the rotation of the engine or transmission input shaft, for example. Thus, the hydraulic pressure generated in mechanical oil pump 214 may increase as an engine speed increases, and may decrease as an engine speed decreases. An electric oil pump 220, also in fluid communication with the automatic transmission but operating independent from the driving force of engine 10 or transmission 208, may be provided to supplement the hydraulic pressure of the mechanical oil pump 214. Electric oil pump 220 may be driven by an electric motor (not shown) to which an electric power may be supplied, for example by a battery (not shown).

A controller 12 may be configured to receive inputs from engine 10, as shown in more detail in FIG. 1, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or supercharged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 12 may initiate engine shutdown by shutting off fuel and spark to the engine. Further, to maintain an amount of torsion in the transmission, the controller may ground rotating elements of transmission 208 to a case of the transmission and thereby to the frame of the vehicle. As further elaborated with reference to FIG. 6, the controller may engage one or more transmission clutches, such as forward clutch 210, and lock the engaged transmission clutch(es) to the transmission case and vehicle frame. A clutch pressure may be varied (e.g., increased) to adjust the engagement state of a transmission clutch, and provide a desired amount of transmission torsion. In one example, during the engine shutdown, hydraulic pressure for clutch modulation may be provided by enabling the electric oil pump 220, if sufficient hydraulic pressure cannot be provided by the mechanical oil pump 214.

A wheel brake pressure may also be adjusted during the engine shutdown, based on the clutch pressure, to assist in tying up the transmission while reducing a torque transferred through the wheels. Specifically, by applying the wheel brakes while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

When restart conditions are satisfied, and/or a vehicle operator wants to launch the vehicle, controller 12 may reactivate the engine by resuming cylinder combustion. As further elaborated with reference to FIGS. 3-6, to launch the vehicle, transmission 208 may be unlocked and the wheel brakes 218 may be released, to return torque to the driving wheels 216. A clutch pressure may be adjusted to unlock the transmission, while a wheel brake pressure may be adjusted to coordinate the release of the brakes with the unlocking of the transmission, and a launch of the vehicle.

Thus, the system of FIGS. 1 and 2 provides for a system for starting an engine coupled to a transmission, comprising: an engine; a transmission coupled to the engine, the transmission including a transmission input torque sensor; and a controller including instructions to engage an on-coming clutch during an engine start after beginning to release an off-going clutch during an engine speed run-up from engine cranking to idle speed. The system includes where the off-going clutch activates and deactivates a first gear, where the on-coming clutch activates a second gear, the first gear having a lower ratio than the second gear, and further comprising additional controller instructions to adjust a commanded engine speed during the engine speed run-up from cranking to idle speed. The system also includes where the commanded engine speed is commanded to two or more levels during engine speed run-up. The system also includes where one level of the commanded engine speed is initiated at a time that is based on a transmission output torque. Further, the system includes where one level of the commanded engine speed that is initiated at a time that is based on a predetermined amount of time since beginning of transmission shifting. Further still, the system includes where the engine is automatically started without an operator request to start the engine.

Referring to FIG. 3, an example plot of a simulated engine start sequence by the method of FIG. 6 is shown. Time begins on the left side of the plot and increases to the right side of the plot. The illustrated sequence represents a start of a non-limiting four cylinder four cycle engine. In this example, the vertical markers $T_0$-$T_7$ represent times of particular interest during the sequence. The sequence of FIG. 3 may be provided via controller 12 of FIG. 1 executing instructions according to the method of FIG. 6.

The first plot from the top of FIG. 3 represents oil pressure supplied to an off-going clutch via a valve controlled via controller 12. Oil pressure and torque transmitting capacity of the off-going clutch is increased in the direction of the Y axis arrow. The oil pressure and torque transmitting capacity of the off-going clutch are near zero at the X axis. An off-going clutch may be a gear clutch such as first through eighth gear that is being released.

The second plot from the top of FIG. 3 represents oil pressure supplied to a tie-up clutch via a valve controlled via controller 12. Oil pressure and torque transmitting capacity of the tie-up clutch is increased in the direction of the Y axis arrow. The oil pressure and torque transmitting capacity of the tie-up clutch are near zero at the X axis. A tie-up clutch may be any gear or forward clutch that can ground rotating elements of the transmission to the transmission case.

The third plot from the top of FIG. 3 represents transmission input shaft torque as sensed via sensor 250 of FIG. 2. Transmission input shaft torque is increased in the direction of the Y axis arrow. The transmission shaft torque is at zero at the X axis.

The fourth plot from the top of FIG. 3 represents oil pressure supplied to an on-coming clutch via a valve controlled via controller 12. Oil pressure and torque transmitting capacity of the on-coming clutch is increased in the direction of the Y axis arrow. The oil pressure and torque transmitting capacity of the on-coming clutch are near zero at the X axis.

The fifth plot from the top of FIG. 3 represents commanded desired engine speed. The engine speed may be controlled to the desired speed by adjusting one of more of a group comprising throttle position, fuel injection start of injection timing, spark timing, and fuel injection amount. The desired engine speed increases in the direction of the Y axis arrow.

The sixth plot from the top of FIG. 3 represents engine speed as determined from the engine crankshaft position sensor. Engine speed increases in the direction of the Y axis arrow. Engine speed is zero at the X axis.

The seventh plot from the top of FIG. 3 represents transmission output shaft speed (OSS). Transmission shaft output speed increases in the direction of the Y axis arrow. Transmission shaft output speed is zero at the X axis.

The eighth plot from the top of FIG. 3 represents commanded transmission gear. The commanded transmission gear is indicated by the numeral along the Y axis.

At time $T_0$, the engine is stopped and the off-going clutch is engaged. The off-going clutch in this example allows engine torque to pass through a higher gear (e.g., third gear) having a lower gear ratio. The tie-up clutch is also engaged so that engine torque that is transmitted to the transmission via the torque converter is grounded to the transmission case. Torque at the transmission input shaft is at zero while the engine is stopped. The on-coming transmission clutch in this example is a lower gear (e.g., first gear) having a higher gear ratio, and the on-coming transmission clutch is disengaged at time $T_0$. The desired engine speed is commanded to a first level that provides a desired amount of air to engine cylinders during engine cranking and into engine run-up (e.g. time between engine cranking speed and engine idle speed). The transmission output speed is at zero and the transmission is engaged in third gear via the off-going clutch at time $T_0$.

At time $T_1$, engine cranking begins. The engine may be cranked via a starter motor or a motor of a hybrid powertrain, for example. Cranking the engine causes engine speed to increase; however, the state of transmission clutches and transmission gear remain unchanged during engine cranking.

At time $T_2$, the engine begins to rotate under its own power and cranking ceases. The engine clutches and transmission gear remain unchanged as the engine exits cranking. Starting the engine in a higher gear, such as third gear, reduces the amount of engine torque that is applied to the transmission case via the transmission tie-up clutch as torque converter speed increases with engine speed. In this way, the amount of engine torque that is transferred to the transmission case may be reduced during engine run-up. Transmission input torque begins to increase as engine speed increases and as some engine torque is transmitted to the transmission input shaft via the torque converter. Engine speed is also shown increasing toward a desired engine idle speed. The transmission output shaft speed remains at zero since the transmission input is tied to the transmission case.

At time $T_3$, the transmission gear is commanded to downshift or change from third gear to first gear. Transitioning to a lower gear allows the engine to accelerate a vehicle at a higher rate from stop as compared to if the engine accelerates the vehicle while in third gear. The time at which the gear change is commanded may be based on a threshold engine speed, amount of time since exiting cranking, or a driver input. For example, the time the transmission is shifted after exiting crank may be based on vehicle parameters such as engine inertia, the transmission gear that is engaged at engine start, engine temperature, and grade of the road that the vehicle coupled to the engine is stopped on. In one example, the vehicle parameters may be used to index tables or functions containing empirically determined multipliers that operate on a base transmission shift time (e.g., 0.5 seconds after exiting engine cranking). The multipliers may increase or decrease the base shift time relative to the time cranking is exited to improve vehicle launch or limit torque during engine starting.

The off-going clutch and the tie-up clutch begin to release at time $T_3$ so that engine torque will not be transferred to the transmission case and so that the transmission transitions out of third gear. The off-going and tie-up clutches may be ramped off or may be released in a step-wise manner. The on-coming clutch remains disengaged at time $T_3$ while the engine speed continues to increase toward the first desired engine speed. The desired engine speed remains unchanged and the transmission input torque continues to rise as a result of engine speed increasing and third gear being partially engaged via the off-going clutch.

At time $T_4$, the off-going clutch and the tie-up clutches continue to disengage and are disengaged to a point where the transmission input torque begins to decrease via slippage of the off-going clutch. The desired engine speed remains unchanged and engine speed continues to increase toward idle speed. The transmission output shaft speed remains at zero and the transmission command stays at first gear.

At time $T_5$, the transmission input shaft torque has decreased to by an amount 304 where it is desirable to engage the on-coming clutch to apply first gear. In other examples, transmission input shaft torque may drop to a predetermined level where it is desirable to engage the on-coming clutch to apply a different gear. The transmission input shaft torque level where the on-coming clutch is engaged may vary with operating conditions. For example, when transmission temperature is lower, the on-coming clutch may be engaged earlier when the transmission input torque is at a higher level as compared to when the transmission input torque is decreased when the transmission is shifted with warmer transmission oil. The on-coming clutch is shown ramping up to smooth the torque transfer from third gear to first gear.

The desired engine speed is also reduced to a second level at time $T_5$ when the on-coming clutch is engaged. The desired engine speed may be adjusted in a step-wise manner or ramped as shown at 310. In one example, lowering the desired engine speed reduces the cylinder air charge and engine fuel amount so that engine speed decreases and less torque may be transmitted through the torque converter to the transmission. Engine speed begins to fall in response to desired engine speed being reduced. The transmission output shaft speed remains at zero since little torque is transferred to the transmission output shaft via the on-coming clutch. The transmission also remains commanded in first gear.

Between times $T_5$ and $T_6$, the off-going and tie-up clutches are ramped completely off. Substantially no torque is transmitted through the off-going and tie-up clutches after they are ramped off. Further, the capacity of the on-coming clutch to transmit engine torque through the transmission is increased as the on-coming clutch is engaged, thereby causing the transmission input torque to increase. The transmission input shaft torque increases because the transmission input shaft spins less freely due to resistance from the transmission output shaft being coupled to the vehicle wheels as the on-coming clutch is engaged.

At time $T_6$, the on-coming clutch is engaged to a level where engine torque is transmitted through the transmission causing the transmission output shaft to rotate. In this example, the time between $T_3$ and where the transmission output speed reaches a threshold speed may be defined as the shift time, and the end of shift is the time the transmission output speed reaches the threshold speed. The desired engine speed is increased to a third level when the shift is determined to be complete (e.g., when transmission output shaft reaches a threshold speed). The desired engine speed may be adjusted in a step-wise manner or ramped as shown at 312. Increasing the desired engine speed provides additional air and fuel to the engine so that engine speed may be increased. In some examples, the desired engine speed may also be increased in response to a driver depressing an accelerator pedal. Thus, desired engine speed can be adjusted during a shift in response to several engine operating conditions.

Between time $T_6$ and $T_7$, the transmission input shaft torque continues to increase as the on-coming clutch approaches a fully engaged position and as engine speed is increased in response to the third level of desired engine speed. The transmission output shaft speed stabilizes at a speed and in some examples may return to a level of zero unless the driver increases an engine torque demand. The desired engine speed remains at the third level so as to reduce the engine torque transferred through the torque converter until the gear shift is complete.

At time $T_7$, the on-coming clutch is fully engaged and the transmission input torque begins to stabilize. In examples where the driver increases the engine torque command, the transmission input shaft torque may continue to increase.

Thus, FIG. 3 shows an engine starting sequence where some clutches of a transmission are disengaged during engine run-up while other clutches are engaged in response to a decrease in transmission input shaft torque. Further, the desired engine speed is adjusted in response to transmission input shaft torque at the beginning of the transmission shift and in response to transmission output shaft speed at the end of the shift. The sequence of FIG. 3 may limit engine torque initially transmitted through a transmission during an engine start while the transmission is engaged in a gear. The sequence also increases the amount of engine torque transmitted through the transmission after a shift occurs so that vehicle launch may be improved.

Referring now to FIG. 4, another example plot of an engine start is shown. The plots of FIG. 4 are similar to the plots of FIG. 3. Therefore, a repeated description of the plot overview is omitted for the sake of brevity. The sequence of FIG. 4 may be provided via controller 12 of FIG. 1 executing instructions according to the method of FIG. 6.

At time $T_0$, the engine is stopped and the off-going clutch is engaged. The off-going clutch in this example allows engine torque to pass through a higher gear (e.g., third gear) having a lower gear ratio. The tie-up clutch is also engaged so that engine torque that is transmitted to the transmission via the torque converter is grounded to the transmission case. Torque at the transmission input shaft is at zero while the engine is stopped. The on-coming transmission clutch in this example is a lower gear (e.g., first gear) having a higher gear ratio, and the on-coming transmission clutch is disengaged. The desired engine speed is commanded to a first level that provides a desired amount of air to engine cylinders during engine cranking and into run-up (e.g. time between engine cranking speed and engine idle speed). The transmission is engaged in third gear via the off-going clutch.

At time $T_1$, engine cranking begins. The engine may be cranked via a starter motor or a motor of a hybrid powertrain, for example. Cranking the engine causes engine speed to increase; however, the state of transmission clutches and transmission gears remain unchanged during engine cranking.

At time $T_2$, the engine begins to rotate under its own power and cranking ceases. The state of engine clutches and transmission gears remain unchanged as the engine exits cranking. Engine speed is also shown increasing toward a desired engine idle speed.

At time $T_3$, the transmission gear is commanded to downshift or change from third gear to first gear. The time at which the gear change is commanded may be based on a threshold engine speed, amount of time since exiting cranking, or a driver input. The off-going clutch begins to release at time $T_3$ but the tie-up clutch remains fully engaged. Holding the tie-up clutch engaged transfers engine torque to the transmission case and may in some examples hold the vehicle in place. The off-going clutch may be ramped off or may be released in a step-wise manner. The on-coming clutch remains disengaged at time $T_3$ while the engine speed continues to increase toward the first desired engine speed. The desired engine speed remains unchanged and the transmission input torque continues to rise as a result of engine speed increasing and third gear being partially engaged via the off-going clutch.

At time $T_4$, the off-going clutch continues to disengage and is disengaged to a point where the transmission input torque begins to decrease via slippage of the off-going clutch. The desired engine speed remains unchanged and engine speed continues to increase toward idle speed.

At time $T_5$, the transmission input shaft torque has dropped by an amount 402 where it is desirable to engage the on-coming clutch to apply first gear. In other examples, transmission input shaft torque may drop to a predetermined level where it is desirable to engage the on-coming clutch to apply a different gear. The transmission input shaft torque level where the on-coming clutch is engaged may vary with operating conditions. The on-coming clutch is shown ramping up to smooth torque transfer from third gear to first gear.

The desired engine speed is also reduced to a second level at time $T_5$ when the on-coming clutch is engaged. The desired engine speed may be adjusted in a step-wise manner or ramped as shown at 410. Engine speed begins to fall in response to desired engine speed being reduced. The transmission also remains commanded in first gear.

Between times $T_5$ and $T_6$, the off-going clutch continues to ramp off and the on-coming clutch continues to ramp on. The tie-up clutch remains engaged so that engine torque transferred to the transmission input shaft is directed to the transmission case. However, since the off-going clutch has released more than the on-coming clutch is engaged, the transmission input shaft torque decreases.

At time $T_6$, the tie-up clutch starts to release. The tie-up clutch may be released in response to an amount that the on-coming clutch is engaged or in response to an amount of transmission input shaft torque. For example, the tie-up clutch may begin to disengage when the on-coming clutch reaches 25% of full stroke. Alternatively, the tie-up clutch may begin to release when the transmission input torque is increasing and above a threshold torque amount. In this example, the threshold level of on-coming clutch application where the tie-up clutch is released is indicated by horizontal marker 406. Holding the tie-up clutch for a period of time after the on-coming clutch begins to engage allows torque to transfer from the engine to the transmission so that the vehicle may remain stationary or accelerate when the tie-up clutch is released.

Between time $T_6$ and $T_7$, the on-coming clutch continues to engage while the tie-up clutch is continues to release. The off-going clutch is also fully released.

At time $T_7$, the on-coming clutch is engaged to a level where torque at the transmission input shaft increases to a threshold level indicated by horizontal marker 404. The desired engine speed is increased when the transmission input shaft torque exceeds threshold level 404. The desired engine speed may be adjusted in a step-wise manner or ramped as shown at 412. In this way, the desired engine speed is based on transmission input shaft torque. The tie-up clutch is also shown being fully disengaged at time $T_7$. However, in other examples, the tie-up clutch may be partially engaged until a time after the desired engine speed is changed. Applying increased engine speed at time $T_7$ allows the engine to supply additional torque to the transmission output shaft without a driver torque command increase since torque transferred through the torque converter can increase at higher torque converter speeds.

At time $T_8$, the on-coming clutch is fully engaged and the transmission input shaft torque continues to increase. The transmission remains engaged in first gear and is ready for an increase in driver demand torque.

Thus, FIG. 4 shows an engine starting sequence where an off-going gear clutch of a transmission is disengaged during engine run-up. Further, a transmission tie-up clutch remains engaged while an on-coming clutch is engaging so as to control delivery of torque from the engine to the vehicle wheels. The on-coming clutch is engaged in response to a decrease in transmission input shaft torque. In addition, the desired engine speed is adjusted in response to transmission input shaft torque at the beginning of the transmission shift and in response to transmission input shaft torque at the end of the transmission shift. Transmission input torque reaching a threshold level after beginning to engage the on-coming clutch indicates end of shift. Alternatively, the desired engine speed may be adjusted according to a predetermined amount of time since the transmission shift was initiated. The sequence of FIG. 4 may limit engine torque initially transmitted through a transmission during an engine start while the transmission is engaged in a gear. The sequence also increases the amount of engine torque transmitted through the transmission after a shift occurs so that vehicle launch may be improved.

Referring now to FIG. 5, another example plot of an engine start is shown. The plots of FIG. 4 are similar to the plots of FIG. 4. Therefore, a repeated description of the plot overview, except for new plots, is omitted for the sake of brevity. The sequence of FIG. 5 may be provided via controller 12 of FIG. 1 executing instructions according to the method of FIG. 6.

The eighth plot from the top of FIG. 5 represents transmission output shaft torque. Transmission output shaft torque may be determined via a torque sensor coupled to or in communication with the output shaft of the transmission. The transmission output shaft torque increases in the direction of the Y axis arrow. The transmission output shaft torque is near zero at the X axis.

At time $T_0$, the engine is stopped and the off-going clutch is engaged. The off-going clutch in this example allows engine torque to pass through a higher gear (e.g., third gear) having a lower gear ratio. The tie-up clutch is also engaged so that engine torque that is transmitted to the transmission via the torque converter is grounded to the transmission case. Torque at the transmission input shaft is at zero while the engine is stopped. The on-coming transmission clutch in this example is a lower gear (e.g., first gear) having a higher gear ratio, and the on-coming transmission clutch is disengaged. The desired engine speed is commanded to a first level that provides a desired amount of air to engine cylinders during engine cranking and into run-up (e.g. time between engine cranking speed and engine idle speed). The transmission is engaged in third gear via the off-going clutch.

At time $T_1$, engine cranking begins. The engine may be cranked via a starter motor or a motor of a hybrid powertrain, for example. Cranking the engine causes engine speed to increase; however, the state of transmission clutches and transmission gears remain unchanged during engine cranking.

At time $T_2$, the engine begins to rotate under its own power and cranking ceases. The state of engine clutches and transmission gears remain unchanged as the engine exits cranking. Engine speed is also shown increasing toward a desired engine idle speed.

At time $T_3$, the transmission gear is commanded to downshift or change from third gear to first gear. The time at which the gear change is commanded may be based on a threshold engine speed, amount of time since exiting cranking, or a driver input. The off-going clutch begins to release at time $T_3$ but the tie-up clutch remains fully engaged. Holding the tie-up clutch engaged transfers engine torque to the transmission case and may in some examples hold the vehicle in place. The off-going clutch may be ramped off or may be released in a step-wise manner. The on-coming clutch remains disengaged at time $T_3$ while the engine speed continues to increase toward the first desired engine speed. The desired engine speed remains unchanged and the transmission input torque continues to rise as a result of engine speed increasing and third gear being partially engaged via the off-going clutch. Torque at the transmission output shaft remains at zero since the transmission is tied up.

At time $T_4$, the off-going clutch continues to disengage and is disengaged to a point where the transmission input torque begins to decrease via slippage of the off-going clutch. The desired engine speed remains unchanged and engine speed continues to increase toward idle speed.

At time $T_5$, the transmission input shaft torque has dropped by an amount 502 where it is desirable to engage the on-coming clutch to apply first gear. Further, the tie-up clutch begins to release at time $T_5$ in response to the transmission input torque being below a threshold level. In other examples, transmission input shaft torque may drop to a predetermined level where it is desirable to engage the on-coming clutch to apply a different gear. The transmission input shaft torque level where the on-coming clutch is engaged may vary with operating conditions. The on-coming clutch is shown ramping up to smooth torque transfer from third gear to first gear. The transmission output shaft torque begins to increase as the tie-up clutch is released.

The desired engine speed is also reduced to a second level at time $T_5$ when the on-coming clutch is engaged. The desired engine speed may be adjusted in a step-wise manner or ramped as shown at 510. Engine speed begins to fall in response to desired engine speed being reduced. The transmission also remains commanded in first gear.

Between times $T_5$ and $T_6$, the off-going clutch continues to ramp off and the on-coming clutch continues to ramp on. The tie-up clutch also continues to ramp off.

At time $T_6$, the off-going clutch is fully released and the tie-up clutch continues to release. The on-coming clutch also continues to engage. Since the tie-up clutch is not fully disengaged, a portion of engine torque transferred to the transmission may be grounded to the transmission case. In addition, the tie-up clutch may reduce vehicle movement until a time when the on-coming clutch is carrying sufficient torque to move the vehicle in a forward direction.

At time $T_7$, the tie-up clutch is fully disengaged. Engine torque transferred to the transmission may be output to vehicle wheels when the tie-up clutch is fully disengaged. Additionally, vehicle movement may be possible when the tie-up clutch is fully disengaged.

At time $T_8$, the transmission output shaft torque is increased to a threshold level indicated by horizontal marker 504. The desired engine speed is increased to a third level in response to the transmission output shaft torque reaching the threshold level. Transmission input shaft torque continues to increase allowing for an improved vehicle launch. The on-coming clutch is fully engaged at time $T_9$ allowing for additional engine torque to be transferred through the transmission.

Thus, FIG. 5 shows an engine starting sequence where an off-going gear clutch of a transmission is disengaged during engine run-up. Further, a transmission tie-up clutch remains engaged for at least a portion of time while an on-coming clutch is engaging so as to control delivery of torque from the engine to the vehicle wheels. The on-coming clutch is engaged in response to a decrease in transmission input shaft torque. Further still, the desired engine speed is adjusted in response to transmission input shaft torque at the beginning of the transmission shift and in response to transmission output shaft torque at the end of the transmission shift. The end of the shift is indicated by the transmission output shaft torque reaching a predetermined threshold level. The sequence of FIG. 4 may limit engine torque initially transmitted through a transmission during an engine start while the transmission is engaged in a gear. The sequence also increases the amount of engine torque transmitted through the transmission after a shift occurs so that vehicle launch may be improved. It should also be mentioned that in some examples, engine torque may be limited during shifting (e.g., time from off-going clutch release to a threshold transmission output shaft torque level or other condition mentioned above is reached).

Referring now to FIG. 6, a flowchart of an example method for engine starting is shown. The method of FIG. 6 may be executed via instructions of a controller in a system as shown in FIG. 1.

At 602, routine 600 determines operating conditions. Operating conditions may include but are not limited to engine speed, engine load, time since engine cranking, transmission input shaft torque, transmission output shaft torque, engine temperature, vehicle speed, brake pedal position, accelerator pedal position, and battery state of charge.

At 604, method 600 judges whether or not an automatic engine start is requested. An automatic engine start is different from an operator or driver engine start in that the driver does not request an engine start via a control with a sole purpose of starting an engine (e.g., a key switch or pushbutton). On the other hand, an automatic engine start may be requested via a controller responding to a driver releasing a brake or a low state of battery charge, for example. If there is a request to automatically restart the engine, method 600 answers yes and proceeds to 606. Otherwise, method 600 answers no and proceeds to exit.

At 606, method 600 requests a desired engine speed. In one example, the desired engine speed may be a desired engine idle speed. The desired engine speed may be determined via indexing tables or functions that include empirically determined engine speed values. The tables may be indexed using engine temperature and ambient temperature, for example. The desired engine speed may be an input to determining engine throttle position, valve timing, and fuel timing. Method 600 proceeds to 608 after the desired engine speed is requested.

At 608, method 600 cranks the engine to start combustion. The engine may be cranked via a starter motor or via a motor that can propel the vehicle such as in a hybrid vehicle. Further, air, spark, and fuel are supplied to the engine during cranking to facilitate combustion. Thus, method 600 exits cranking in response to engine speed greater than a threshold speed. Method 600 proceeds to 610 after combustion begins and engine speed is greater than a threshold speed.

At 610, method 600 schedules the time the off-going clutch begins to release. Initially at engine stop and during engine cranking, a transmission coupled to the engine is engaged in a gear. The gear may be any forward gear of the transmission, but a higher gear than first gear may be engaged in some examples to limit torque transmitted through the transmission and to the transmission case or vehicle wheels. For example, third or fifth gear of a transmission may be engaged during an engine start. Further, different gears may be engaged during different operating conditions during some automatic starts. For example, in a first automatic engine start, a transmission may be engaged in third gear while during a different start the transmission may be engaged in fifth gear. The off-going clutch engages the gear that will provide torque to propel the vehicle forward if torque is supplied by the engine to the transmission.

In one example, the off-going clutch may begin to be released a predetermined amount of time after the engine exits cranking mode under its own power. In another example, the off-going clutch may begin to be released when engine speed exceeds a threshold engine speed. In still another example, the off-going clutch may begin to be released in response to a driver command such as input to an accelerator. Further, the off-going clutch may begin to be released based on engine speed, time sense exiting crank, and driver input. The off-going clutch is scheduled based on one or more conditions described previously. Method 600 proceeds to 612 after the off-going clutch is scheduled for release.

At 612, method 600 schedules release of a tie-up clutch of a transmission. The tie-up clutch grounds the transmission input shaft to the transmission case. The tie-up clutch may begin to be released at different times for different engine operating conditions. In some examples, the tie-up clutch may begin to be released a predetermined amount of time after the engine exits cranking under the engine's own power. In other examples, the tie-up clutch may begin to be released at the same time the off-going clutch is released. In other examples, the tie-up clutch may begin to be released a predetermined amount of time after an on-coming clutch begins to engage by receiving oil at increased pressure. In still other conditions, the tie-up clutch may be begin to be released a predetermined amount of time after the off-going clutch begins to release. Method 600 proceeds to 614 after the tie-up clutch is scheduled to be released.

At 614, method 600 schedules beginning of applying of the on-coming clutch. The on-coming clutch may begin to be engaged a predetermined amount of time after the off-going clutch begins to release or a predetermined time after the engine exits crank. In other examples, the on-coming clutch may be scheduled to begin to be applied when torque at the transmission input shaft is less than a threshold level. In still other examples, the on-coming clutch may be scheduled to begin to be applied when torque at the transmission input shaft has been reduced by more than a predetermined amount. Method 600 proceeds to 616 after the on-coming clutch is scheduled to be released.

At 616, the desired engine speed is adjusted. In one example, the desired engine speed is reduced when torque at the input shaft of the transmission is less than a threshold amount during engine speed run-up as the off-going clutch is being released. In another example, the desired engine speed is reduced when torque at the input shaft of the transmission is reduced by more than a threshold amount during engine speed run-up as the off-going clutch is being released. In still other examples, the desired engine speed may be adjust based on a time since exiting crank or a time since beginning to release an off-going clutch. Method 600 proceeds to 618 after the desired engine speed is adjusted.

At 618, method 600 operates the off-going clutch, tie-up clutch, and the on-coming clutch according to the scheduled release and apply times and/or conditions. The clutches may be operated via the controller commanding valves supplying oil to the clutches. Method 600 proceeds to 620 after the shift sequence is initiated via commanding the clutches.

At 620, method 600 determines whether or not transmission is at an end of the shift. The end of shift may be indicted by transmission output shaft speed exceeding a threshold level. A change in transmission output shaft speed (OSS) may be indicated when an on-coming clutch reaches a threshold level of application where transmission output shaft speed increases. In other examples, an end of shift may be identified by expiration of a predetermined amount of time since another event. For example, an end of shift may be determined after a predetermined amount of time has expired since the engine exits crank or since the off-going clutch began to release. In another example, an end of shift may be determined when an input shaft torque sensor (ISTS) output increases to indicate a predetermined threshold torque level after releasing an off-going clutch and beginning to apply an on-coming clutch. In still another example, an end of shift may be determined when an output shaft torque sensor (OSTS) increases to indicate a predetermined threshold torque level after releasing an off-going clutch and beginning to apply an on-coming clutch. Method 600 proceeds to 622 after checking conditions to determine an end of shift.

At 622, method 600 judges whether or not end of a transmission shift is determined. If so, method 600 answers yes and proceeds to 624. If not, method 600 answers no and returns to 620.

At 624, method 600 judges whether or not a predetermined amount of time has passed sense the end of transmission shift occurred. In one example, the predetermined time may be adjustable and may vary depending on engine and transmission operating conditions. If method 600 determines that a predetermined amount of time has passed, method 600 answers yes and proceeds to 626. Otherwise, method 600 answers no and returns back to 624.

At 626, method 600 adjusts the desired engine speed. In some examples, the desired engine speed is increased from the desired engine speed during the transmission speed. Further, the desired engine speed after the shift may be adjusted to a level that is less than the desired engine speed before the transmission shift was initiated. Adjusting the desired engine speed may include opening the engine throttle, adjusting engine valve timing, and changing fuel injection timing. Method 600 proceeds to exit after desired engine speed is adjusted.

In this way, the method of FIG. 6 provides for adjusting engine speed during transmission shifting during an engine start so that engine torque may be lowered during a shift and increased after the shift. The method of FIG. 6 also provides for adjusting timing of transmission clutches during a shift so as to reduce torque disturbances to the driver and improve vehicle launch.

Thus, the method of FIG. 6 provides for a method for starting an engine coupled to a transmission, comprising: cranking the engine from stop; releasing a transmission off-going clutch to downshift the transmission during engine speed run-up from cranking to idle speed; and applying a transmission on-coming clutch in response to a transmission input torque reduction brought about via the off-going clutch. The method also includes where the transmission on-coming clutch is applied in response to a transmission torque sensor output decreasing by a threshold amount. In this way, transmission clutch application and release times may be related to engine and transmission conditions.

The method also includes where the transmission off-going clutch applies a first gear of the transmission and where the transmission on-coming clutch applies a second gear of the transmission. The method further comprises commanding a first desired engine speed while the first gear is engaged via the transmission off-going clutch. In another example, the method further comprises commanding a second desired engine speed while the transmission off-going clutch is being disengaged. In still another example, the method further comprises commanding a third desired engine speed after commanding the second desired engine speed, the third desired engine speed commanded in response to a speed of an output shaft of the transmission.

The method of FIG. 6 also provides for a method for starting an engine coupled to a transmission, comprising: cranking the engine from stop with a transmission off-going clutch engaged; releasing the transmission off-going clutch to downshift the transmission during engine speed run-up from cranking to idle speed; applying a transmission on-coming clutch in response to a reduction of a transmission input torque brought about via the transmission off-going clutch; and adjusting an idle speed of the engine in response to condition of the transmission. In this way, timing of applying the on-coming clutch can be made more repeatable.

The method also includes where the condition of the transmission is an output speed of the transmission. The method further includes where the condition of the transmission is a transmission output torque. In some examples, the method includes where the condition of the transmission is a transmission shift time. The method further comprises releasing a transmission tie-up clutch. The method also includes where the transmission tie-up clutch begins to be released after engagement of the transmission on-coming clutch begins. Further, the method includes where the transmission tie-up clutch begins to be released before engagement of the transmission on-coming clutch begins. The method also includes where the condition of the transmission is a transmission input torque demand.

As will be appreciated by one of ordinary skill in the art, methods described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

The invention claimed is:

1. A method for starting an engine coupled to a transmission, comprising:
   cranking the engine from stop;
   releasing a transmission off-going clutch to downshift the transmission during engine speed run-up from cranking to idle speed; and
   applying a transmission on-coming clutch in response to a transmission input torque reduction brought about via the transmission off-going clutch, the transmission having a plurality of fixed transmission gear ratios.

2. The method of claim 1, wherein the transmission off-going clutch and on-coming clutch activate the fixed transmission gear ratios.

3. The method of claim 1, where the transmission on-coming clutch is applied in response to a transmission input shaft torque sensor output decreasing by a threshold amount.

4. The method of claim 1, where the transmission off-going clutch applies a first gear of the transmission and where the transmission on-coming clutch applies a second gear of the transmission.

5. The method of claim 4, further comprising commanding a first desired engine speed while the first gear is engaged via the transmission off-going clutch.

6. The method of claim 5, further comprising commanding a second desired engine speed while the transmission off-going clutch is being disengaged.

7. The method of claim 6, further comprising commanding a third desired engine speed after commanding the second desired engine speed, the third desired engine speed commanded in response to a speed of an output shaft of the transmission.

8. A method for starting an engine coupled to a transmission, comprising:
   cranking the engine via a motor of a hybrid powertrain with a transmission off-going clutch engaged;
   releasing the transmission off-going clutch to downshift the transmission during engine speed run-up from cranking to idle speed;
   applying a transmission on-coming clutch in response to a reduction of a transmission input torque brought about via the transmission off-going clutch; and
   adjusting an engine idle speed in response to a condition of the transmission.

9. The method of claim 8, where the condition of the transmission is a transmission shift time.

10. The method of claim 9, further comprising releasing a transmission tie-up clutch.

11. The method of claim 10, where the transmission tie-up clutch begins to be released after engagement of the transmission on-coming clutch begins.

12. The method of claim 10, where the transmission tie-up clutch begins to be released before engagement of the transmission on-coming clutch begins.

13. The method of claim 8, where the condition of the transmission is an output speed of the transmission.

14. The method of claim 8, where the condition of the transmission is a transmission output torque.

15. The method of claim 8, where the condition of the transmission is a transmission input shaft torque.

16. A system for starting an engine coupled to a transmission, comprising:
   an engine;
   a transmission coupled to the engine, the transmission including a transmission input torque sensor, a plurality of fixed transmission gear ratios; and
   a controller including instructions to engage an on-coming clutch during an engine start after beginning to release an off-going clutch during an engine speed run-up from engine cranking to idle speed.

17. The system of claim 16, where the engine is automatically started via a motor without an operator request to start the engine.

18. The system of claim 16 wherein the controller automatically stops the engine responsive to vehicle operating conditions.

19. The system of claim 16, where the off-going clutch activates and deactivates a first gear, where the on-coming clutch activates a second gear, the first gear having a lower ratio than the second gear, and further comprising additional controller instructions to adjust a commanded engine speed during the engine speed run-up from cranking to idle speed.

20. The system of claim 19, where the commanded engine speed is commanded to two or more levels during engine speed run-up.

* * * * *